United States Patent
Kardash

Patent Number: 6,124,689
Date of Patent: Sep. 26, 2000

[54] TRAPEZOIDAL SPINDLE MOTOR DRIVER

[75] Inventor: John Kardash, Ione, Calif.

[73] Assignee: Quantum Corporation, Milpitas, Calif.

[21] Appl. No.: 09/277,011

[22] Filed: Mar. 26, 1999

[51] Int. Cl.$^7$ .................................................. H02P 1/18
[52] U.S. Cl. ........................ 318/254; 318/439; 318/138; 388/811
[58] Field of Search ..................... 318/254, 439, 318/138, 503, 810–811; 388/811, 819, 829

[56] References Cited

U.S. PATENT DOCUMENTS

| | | | |
|---|---|---|---|
| 4,558,264 | 12/1985 | Weischedel | 318/254 |
| 4,581,565 | 4/1986 | Van Pelt et al. | 318/294 |
| 4,884,183 | 11/1989 | Sable | 363/41 |
| 5,512,805 | 4/1996 | Rohrbaugh et al. | 318/254 |
| 5,825,145 | 10/1998 | Pham et al. | 318/439 |
| 5,977,737 | 11/1999 | Labriola, II | 318/599 |

*Primary Examiner*—Paul Ip
*Assistant Examiner*—Rina I. Duda
*Attorney, Agent, or Firm*—Michael Zarrabian

[57] ABSTRACT

A motor driver circuit for a three-phase wound disk drive spindle motor having multiple phase coils and corresponding coil drivers, and commutation phase generation means responsive to BEMF voltage zero crossings of the phase coils for generating commutation cycle control signals for the motor phases. The motor driver circuit comprises: a sensor for sensing a voltage level of a coil; a timing signal generator for generating successive state control signals in response to said commutation timing signals, the state control signals corresponding to successive BEMF voltage zero crossings of the phase coils, wherein a pulse generation interval is defined by a pair of successive state control signals; and a pulse generator coupled to the sensor and responsive to the state control signals, for generating a train of drive control pulses to the corresponding coil driver during each pulse generation interval for controlling current flow in the coil in response to sensed coil current levels to form a desired current waveform therein, each pulse including: (1) an ON period wherein said coil driver applies a drive current to the coil, and (2) an fixed OFF period wherein said coil driver cuts of the drive current to the coil for a fixed time interval.

40 Claims, 8 Drawing Sheets

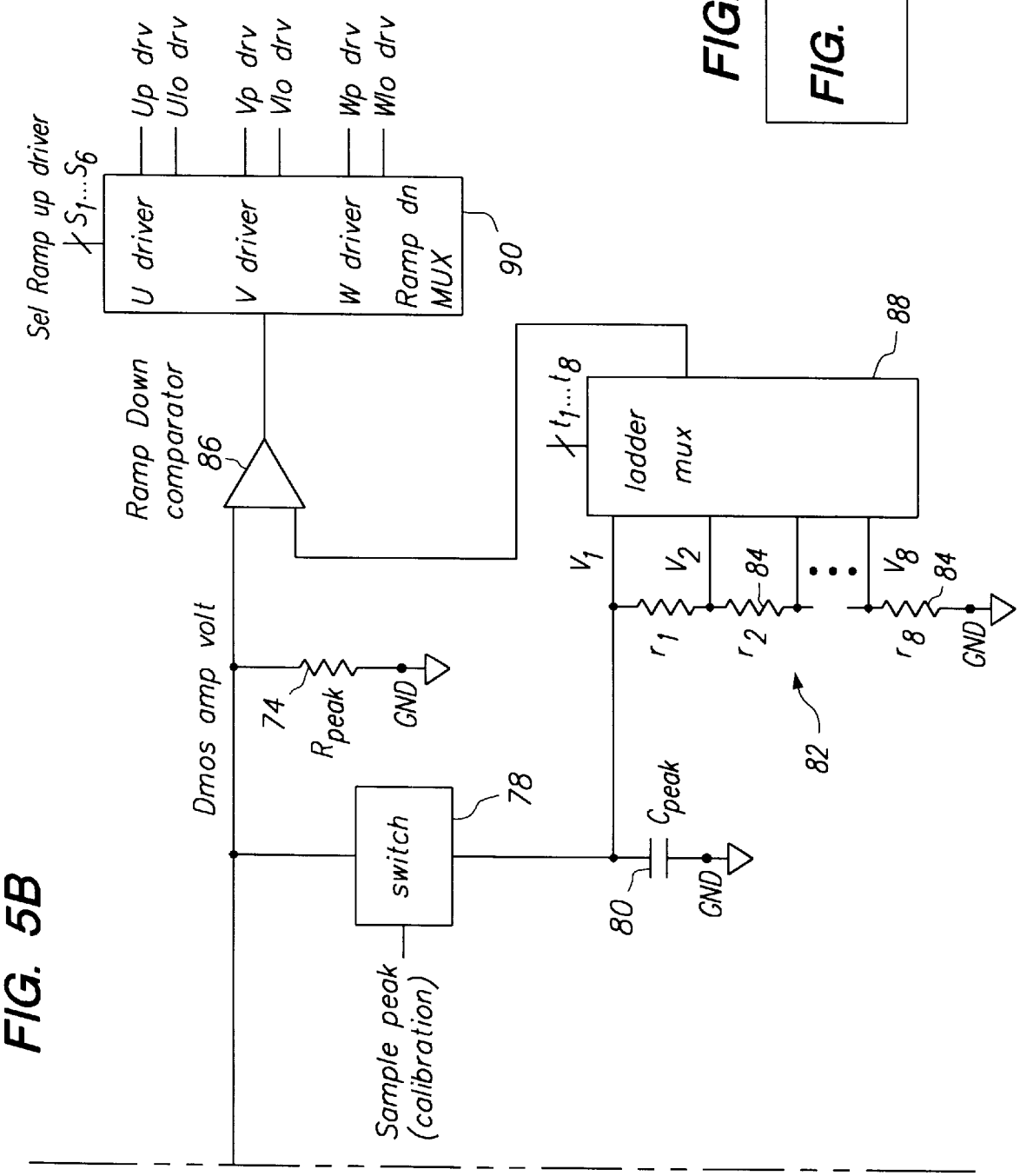

TRAPEZOIDAL SPINDLE MOTOR DRIVER

FIELD OF THE INVENTION

The present invention relates generally to spindle motor drivers, and in particular, to shaping drive current waveforms.

BACKGROUND

A typical disk drive includes a spindle motor for rotating a data disk, and an actuator for moving a head carrier that supports read/write heads radially across the disk to access data stored on concentric data tracks on the disk. An example spindle motor can be a brush less DC motor having three phase coils arranged as a stator, and a rotor having a permanent magnet for rotating the disk. During an acceleration phase, the motor is commutated to start from standstill and accelerate to its operational speed. Thereafter, the motor is commutated to maintain that operational speed, by sequentially energizing appropriate phase coils based on the location of the rotor relative to each phase coil. The energized coils generate torque inducing magnetic fields relative to the rotor magnet that rotate the rotor.

In order to ensure that proper phase coils are energized, indirect or sensorless position detection systems, such as back electromotive force (BEMF) detectors, are utilized to determine the rotor position relative to the coils. BEMF detectors sense back electromotive force transitions in the phase coils, due to magnetic flux caused by a moving rotor, to identify the proper phase coils to be energized. Specifically, when the rotor is moving, the change in the course and direction of the magnetic field lines emanating from the rotor magnet causes a magnetic flux through the stator coils, inducing a current in the stator coils. The current induced in the stator coils is a function of the rotor speed or the frequency of magnetic transitions in the stator coils due to the magnetic flux through the stator coils. The induced current develops a generally sinusoidal BEMF voltage across resistors electrically connected in series with the phase coils, wherein the BEMF voltages provide rotor position information. Once the rotor position is determined, the motor is commutated by sequentially applying drive currents to appropriate coils to provide maximum torque to the rotor.

In each phase coil, the waveform and phase of the drive current signal in relation to the BEMF voltage directly affects motor efficiency and acoustic noise in the motor. As such, conventional motor drivers utilize wave shaping methods to control the slopes of the coil currents to counteract BEMF forces in the coils. This provides optimum torque application to the rotor and reduces acoustic noise from the motor due to smooth transitions of coil currents during commutation. Various schemes to control the slopes of the coil currents to form generally sinusoidal coil currents corresponding to sinusoidal BEMF voltages have been utilized. For example, trapezoidal waveforms have been used as an approximation to the sinusoidal waveforms because of the ease of generating the trapezoidal waveform.

One method of energizing the coils is via Pulse Width Modulation (PWM) to conserve power. In PWM, a train of pulses are applied to energize the coils, whereby power to each coil is switched on and off. As such in conventional methods, PWM is utilized to provide constant currents to the coils without changing the current level when the coils are energized. Since each coil is an inductive load, a change in current flowing through the inductive load during switching causes the voltage across the load to rise or fall. The Pulse Width duration is changed by taking into account several parameters including the coil BEMF voltage, the coil inductance voltage, and the voltage in driver resistive paths due to the coil current, wherein the voltage values must add up to the power supply. However, measuring these parameters for controlling the pulse width duration requires numerous complex steps and circuitry. Further, the aforementioned parameters vary as the rotor is rotating. As such, for each pulse, the parameters must be measured to determine the appropriate pulse width to form the desired current waveform.

There is, therefore, a need for an efficient and simple method of generating desired cyclical signal waveforms for drive currents in a spindle motor for optimum torque application to the rotor and reduction of acoustic noise from the motor.

SUMMARY

The present satisfies these needs. In one embodiment, the present invention provides a motor driver circuit for a three-phase wound disk drive spindle motor having multiple phase coils and corresponding coil drivers, and commutation phase generation means responsive to BEMF voltage zero crossings of the phase coils for generating commutation state control signals for the motor phases. The motor driver circuit comprises: a sensor for sensing a voltage level of a coil; a timing signal generator for generating successive state control signals in response to the commutation timing signals, the state control signals corresponding to successive BEMF voltage zero crossings of the phase coils, wherein a pulse generation interval is defined by a pair of successive state control signals; and a pulse generator coupled to the sensor and responsive to the state control signals, for generating a train of drive control pulses to the corresponding coil driver during each pulse generation interval for controlling current flow in the coil in response to sensed coil current levels to form a desired current waveform therein. Each pulse includes: (1) an ON period wherein said coil driver applies a drive current to the coil, and (2) an fixed OFF period wherein said coil driver cuts off the drive current to the coil for a fixed time interval.

The pulse generator comprises: a controller coupled to the sensor and responsive to each state signal for detecting a peak voltage PV of the coil; a selector circuit coupled to the controller and responsive to selection control signals for selecting a voltage level as a function of the peak voltage PV; and a comparator coupled to the sensor and to the selector circuit for comparing a sensed voltage level of the coil to the selected voltage level, and for generating an output signal having: (1) a first state wherein the coil voltage level is below the selected voltage level, and (2) a second state wherein the coil voltage level is at or above the selected voltage level. The pulse generator further includes a pulse signal generator responsive to the comparator output signal for generating said drive control pulses, wherein each pulse includes: (1) said ON period corresponding to said first state wherein the coil driver applies a drive current to the coil until the coil voltage coil reaches the selected voltage level, and (2) said fixed OFF period triggered by said second state wherein the coil driver cuts off the drive current for a fixed time interval.

Preferably, the motor driver circuit further comprises a divider responsive to the commutation state signals for generating time division signals dividing each pulse generation interval into N time divisions $T_j$, where $j=1 \ldots N$. The divider is coupled to the selector circuit for providing the time division signals as said selection signals, wherein in response to each time division signal, the selector circuit selects a voltage level for a corresponding time division $T_j$. For for each pulse generation interval: (1) the controller detects the peak voltage level PV in a coil substantially at the beginning of the pulse generation interval; and (2) in response to each time division signal corresponding to a time division $T_j$, the selector circuit selects a voltage as function of the voltage PV, whereby the comparator compares the sensed voltage level of the coil to said selected voltage level, and the pulse signal generator generates one or more drive control pulses in response to the comparator signal if needed. In response to each control pulse, the corresponding coil driver applies current to the coil until the coil voltage reaches the selected voltage level, and then cuts off the drive current for a fixed time interval.

In one embodiment, the spindle motor comprises three phase coils and during each pulse generation interval the controller detects the peak voltage of a selected coil when the level of current in a second coil is substantially zero. The motor driver circuit further comprises circuit means for controlling the coil driver corresponding to the second coil such that during the pulse generation interval, the sum of currents through the selected coil and the second coil is substantially equal to the current through the third coil. The motor driver circuit further includes circuit means for maintaining the current level in the third coil at a substantially constant level, whereby said current waveform is generally trapezoidal.

In another aspect, the present invention provides a method of generating desired cyclical current waveforms in one or more of said coils, comprising the steps of: selecting one of the coils; measuring a peak current level flowing through the selected coil during a pulse generation interval; and generating and applying a train of voltage pulses to the selected coil to form the desired current waveform, wherein each pulse includes: (1) an ON interval during which the motor driver applies a drive voltage to the selected coil until the level of current flowing through the selected coil reaches a selected current level as a function of the peak current; and (2) a fixed OFF interval during which the drive voltage is cut off from the selected coil.

Generating said train of voltage pulses further comprises the steps of, for each pulse generation interval: measuring the peak current in a selected coil substantially at the beginning of the pulse generation interval; converting the peak current to a peak voltage PV, and defining N time divisions $T_j$ in the pulse generation interval, where j=1 . . . N, and during each time division $T_j$, performing the steps of: (1) sensing the voltage of the selected coil; (2) applying current to the selected coil as needed until the coil voltage reaches a selected voltage level as a function of the peak voltage PV; (3) ceasing applying current to the coil during the OFF interval; and (4) repeating steps (1) through (3). Preferably, the peak voltage PV is divided into N equal divisions each having a value of PV/N and the step of applying current to the selected coil further includes applying current until the coil voltage reaches a voltage level defined by the voltage function relation PV-(PV/N×(j--1)), where j=1 . . . N. Further, defining the time divisions comprises dividing each pulse generation interval into N time divisions $T_j$, where j=1 . . . N, in response to a time division signal dividing each commutation cycle into N time intervals.

In the embodiment of the spindle motor including three phase coils, during each pulse generation interval the peak current in the selected coil is measured when the level of current in a second coil is substantially zero. Further, a voltage is applied to the second coil such that during said pulse generation interval the sum of currents through the selected coil and the second coil is substantially equal to the current through the third coil. The current level in the third coil is maintained at a substantially constant level, where by said current waveform is generally trapezoidal.

DRAWINGS

These and other features, aspects and advantages of the present invention will become better understood with regard to the following description, appended claims and accompanying drawings where:

DESCRIPTION

Figure 1:
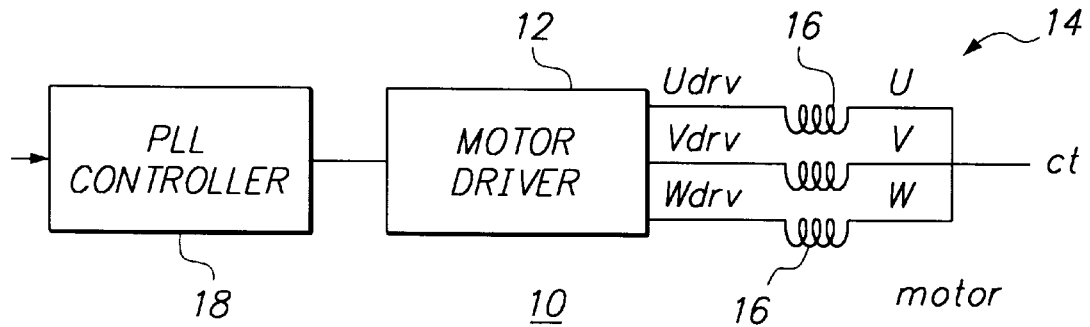
FIG. 1 shows an example block diagram of an embodiment of a spindle motor system in which the present invention can be implemented.

FIG. 1 shows an example block diagram of an embodiment of a spindle motor system 10 in which the present invention can be implemented. The spindle motor system 10 comprises a motor driver circuit 12 for a three-phase wound disk drive spindle motor 14 having multiple phase coils 16 and commutation phase generation means such as a phase lock loop controller (PLL) 18 for generating commutation timing signals for the motor phases. In one embodiment, the spindle motor 14 comprises a brushless DC motor having three phase coils 16 designated as U, V and W, arranged as a stator, and a rotor comprising a magnet. The phase coils 16 are positioned in a fixed base casting, and the rotor is rotatably disposed in the base casting.

Figure 2:
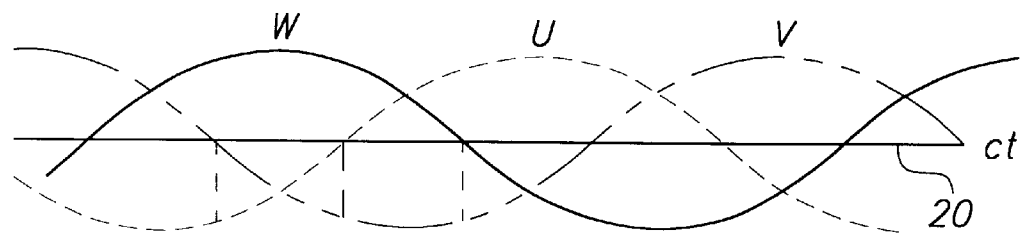
FIG. 2 shows an example timing diagram of freewheeling BEMF voltage waveforms for the spindle motor coils in FIG. 1, and their relative positions due to their respective BEMF voltages when the motor driver circuit is off.

FIG. 2 shows timing diagram of freewheeling voltage waveforms for the coils U, V and W and their relative positions due to their respective BEMF voltages when each coil is off. The crossing of a waveform across a center tap (ct) 20 is referred to as a zero-crossing. Commutation of the spindle motor 14 is performed by the motor driver circuit 12 under timing output signals from the PLL controller 18, whereby the motor driver circuit 12 applies currents to the phase coils 16 to generate torque-inducing flux for moving the rotor. Each coil 16 is electrically connected to a comparator relative to a center tap 20 to provide the BEMF voltage of the coil 16 to the PLL controller 18. Each coil 16 is also connected to the motor driver circuit 12 as described above for application of current to each coil 16. The BEMF voltages from unenergized or off coils 16 are utilized by the PLL controller 18 to determine the rotational position of the rotor relative to the coils and provide a commutation timing signal to the motor driver circuit 12 to energize the coils 16 for application of maximum torque to the rotor. The motor driver circuit 12 turns each coil 16 on in between two BEMF back emf voltage zero-crossings for the coil 16.

Figure 3:
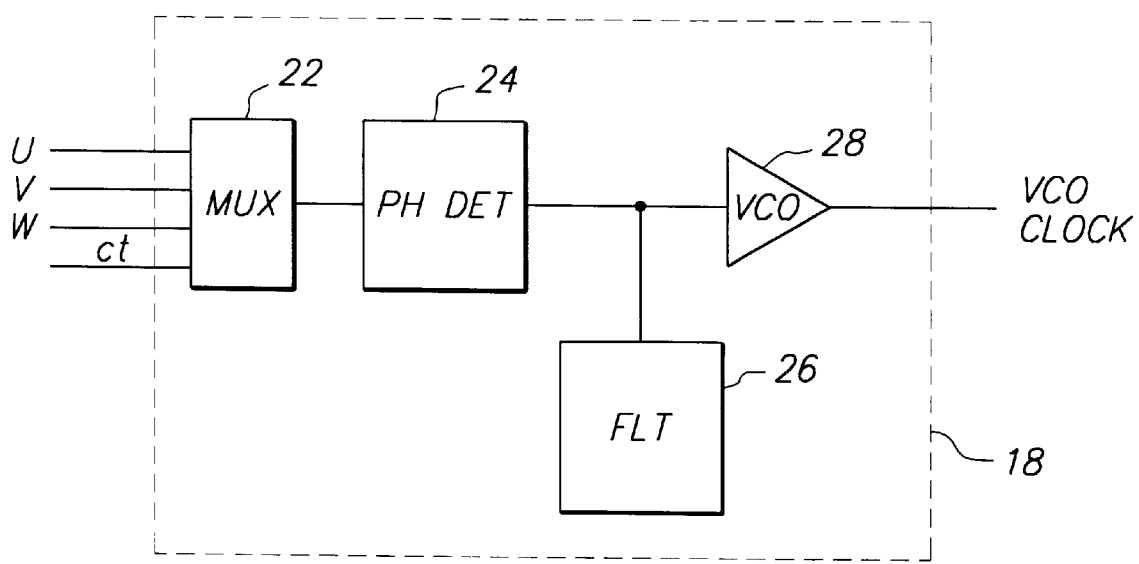
FIG. 3 shows an example block diagram of the phase lock loop controller of FIG. 1.

The timing of the commutations is synchronized with BEMF transitions in the PLL controller 18. Referring to FIG. 3, the PLL controller 18 typically comprises a multiplexer switch 22, a phase detector 24, a filter capacitor 26 and a voltage control oscillator (VCO) 28 for generating commutation timing signals. The multiplexer switch 22, coupled to the phase detector 24, sequences BEMF voltages from the coils 16 such that only voltages from coils in the "off" state are processed by the phase detector 24. The phase detector 24 converts the BEMF voltages to currents to charge or discharge the filter capacitor 26 depending on whether the BEMF voltages are above or below a the center tap 20. In effect, the BEMF voltages are integrated relative to the center tap 20. The VCO 28 then generates a timing output signal (VCO clock) at a frequency proportional to the voltage across the filter capacitor 26. The VCO output signal is used as a clock by the motor driver circuit 12 for timing the commutations, whereby the PLL controller 18 keeps the commutation frequency in phase with the electrical cycles of the motor 14.

Figure 4:
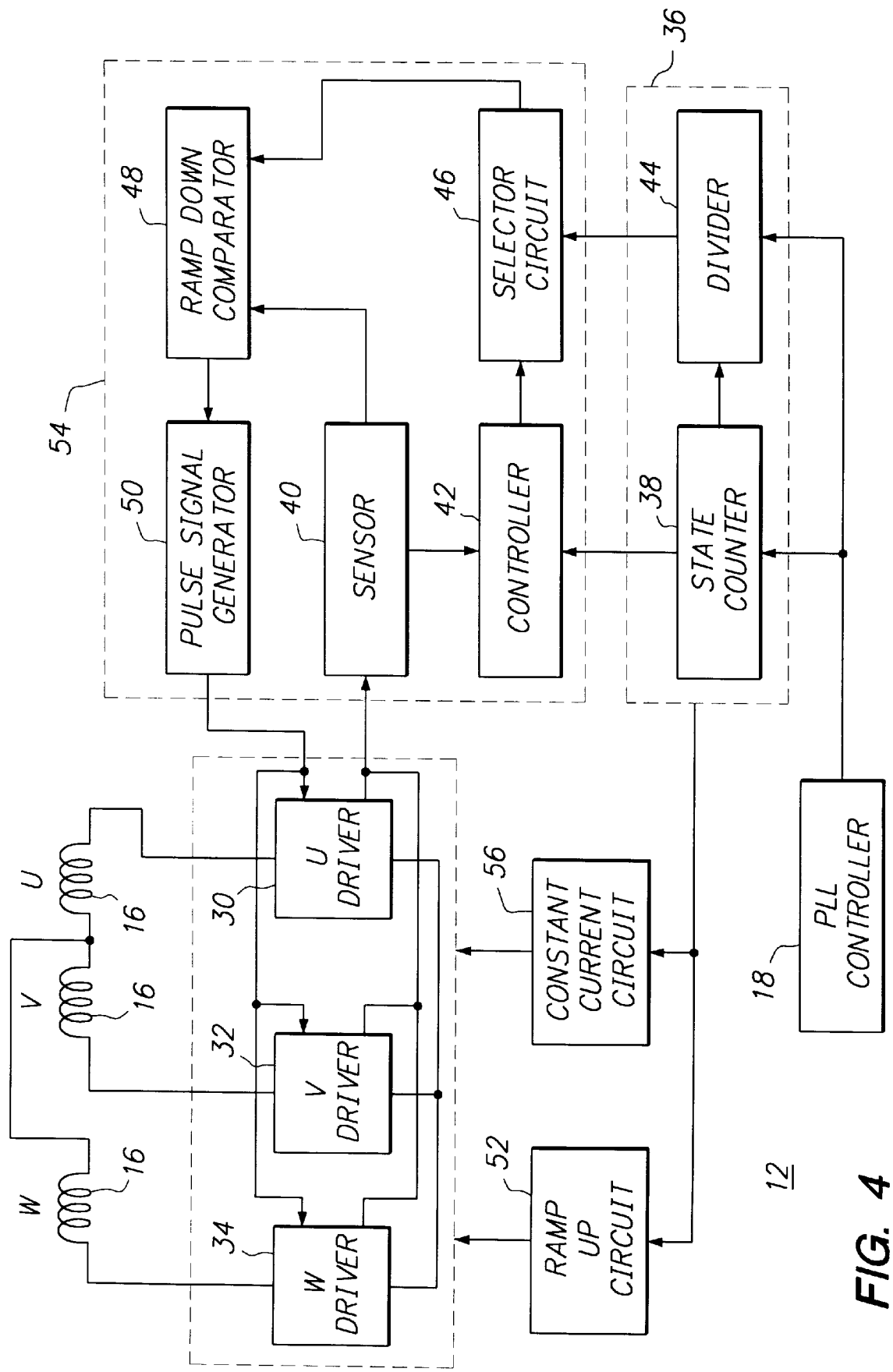
FIG. 4 shows an example block diagram of the motor driver circuit of FIG. 1, interconnected to the spindle motor coils.

FIG. 4 shows an example block diagram of the motor driver circuit 12 of FIG. 1, interconnected to the coils U, V and W of the spindle motor 14. To control the coil current wave shapes, the motor driver circuit 12 comprises a ramp up circuit 52 for controlling coil ramp up currents, a pulse generator circuit 54 for controlling coil ramp down currents, and a constant current circuit 56 for maintaining constant coil currents as described below. The motor driver circuit 14 further comprises three coil drivers 30, 32, 34 for the coils U, V and W, respectively, and a timing signal generator 36 for generating successive state control signals in response to said commutation timing signals. The state control signals correspond to successive BEMF voltage zero crossings of the phase coils 16, and a pulse generation interval is defined by a pair of successive state control signals. In one embodiment, the timing signal generator comprises a state counter 38 and the VCO output signal is coupled to the state counter to sequentially generate six state control signals during each electrical cycle of the motor 14.

The pulse generator circuit 54 comprises a sensor 40 coupled to the coil drivers 30, 32 and 34 for sensing a current level flowing through a coil, and a controller 42 coupled to the sensor 40 and responsive to said state control signals as calibration signals for detecting a peak current level flowing through a selected coil during a pulse generation interval via the sensor 40. A divider 44 is coupled to the VCO output timing signal for generating time division signals dividing each pulse generation interval into N time divisions $T_j$, where j=1 ... N. Further, a selector circuit 46 is coupled to the controller 42 and to the divider 44, wherein in response to each time division signal, the selector circuit 46 selects a current level as a function of the peak current level corresponding to the time division $T_j$.

A comparator 48 is coupled to the sensor 40 and to the selector circuit 46 for comparing the current level in the selected coil to said selected current level, and for generating an output signal having: (1) a first state wherein the current level of the selected coil is below the selected current level, and (2) a second state wherein the current level of the selected coil is at or above the selected current level. A pulse signal generator 50 is coupled to the comparator 48 for generating drive control pulses for the coil driver of the selected coil, wherein each pulse includes: (1) an ON period corresponding to said first state whereby the coil driver applies a drive voltage to the coil until the level of current flowing through the coil reaches the selected current level, and (2) said fixed OFF period triggered by said second state whereby the coil driver cuts off the drive voltage for a fixed time interval.

Therefore, the pulse generator circuit 54 generates a train of drive control pulses to the corresponding coil driver during each pulse generation interval for controlling current flow in the coil in response to sensed coil current levels to form a desired current waveform. During each pulse generation interval: (1) the controller 42 detects the peak current level in a selected coil 16 at a designated time such as substantially at the beginning of the pulse generation interval; and (2) in response to each time division signal corresponding to a time division $T_j$, the selector circuit 46 selects a current level, whereby the comparator 48 compares the current level in the selected coil 16 to said selected current level, and generates said two-state output signal to the pulse signal generator 50 to cause the corresponding coil driver to apply a drive voltage to the selected coil 16 if needed until the level of current flowing through the selected coil 16 reaches the selected current level, and then the coil driver cuts off the drive voltage for a fixed time interval. The above steps are then repeated for the duration of the pulse generation interval, and for subsequent pulse generation intervals.

During each pulse generation interval, the pulse generator circuit 54 provides a current ramp down waveform for a first coil, when the level of current in a second coil is substantially zero. As such, the controller 42 detects the peak current in the first selected coil when the level of current in the second coil is zero. The ramp up circuit 52 provides a current ramp up waveform for the second coil by applying voltage to the second coil such that during the pulse generation interval the sum of currents through the selected coil and the second coil is substantially equal to the current through the third coil. The constant current circuit 65 maintains the current level in the third coil at a substantially constant level, whereby the coil current waveforms are generally trapezoidal.

Figure 5A:
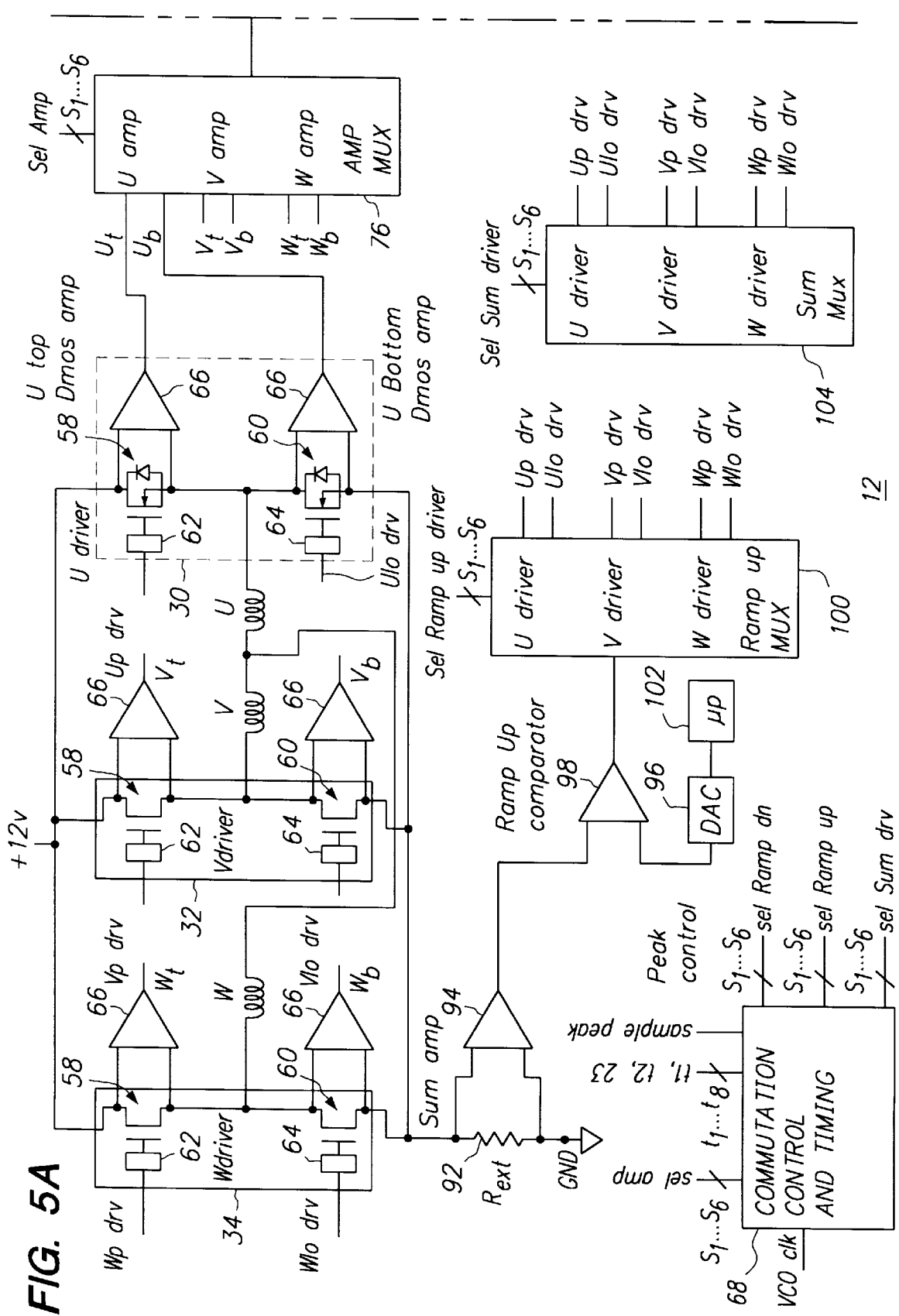
FIG. 5 shows an example block diagram of the architecture of an example implementation of the motor driver circuit of FIG. 4.
Figure 6:
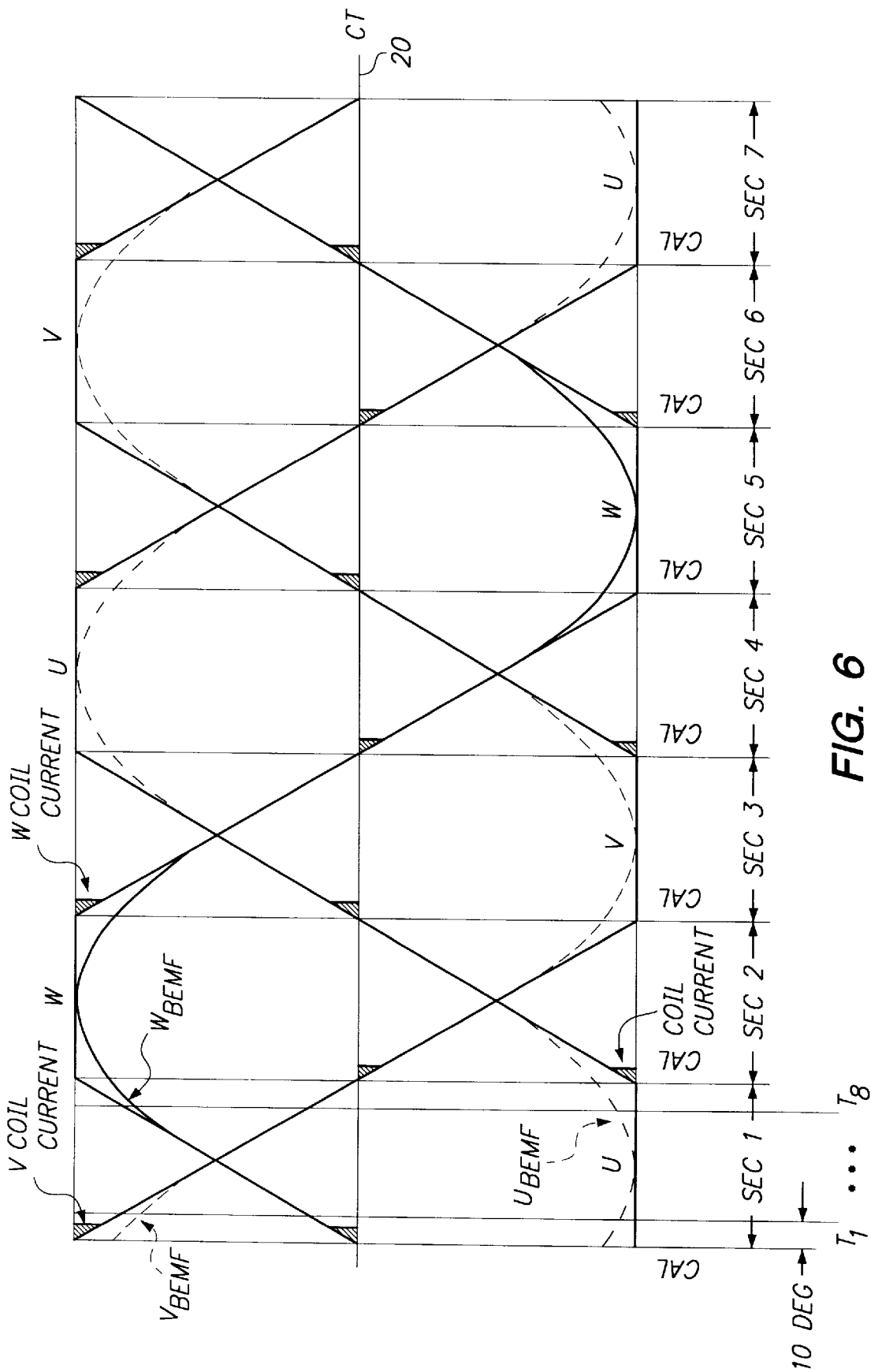
FIG. 6 shows example waveforms for coil currents and corresponding BEMF voltages according to an aspect of the present invention.

FIG. 5 shows a block diagram of the architecture of an example implementation of the motor driver circuit 12 of FIG. 4. The motor driver circuit 12 includes the coil drivers Udriver 30, Vdriver 32, and Wdriver 34 for the three coils U, V and W, respectively. FIG. 6 shows three trapezoidal coil current waveforms for the coils U, V and W, and the associated BEMF voltages, respectively. When commutation is correctly aligned, the coil currents and BEMF voltages have the relationship shown. A zero crossing occurs when the BENF voltage of a coil 16 reaches the ct 20, wherein the coil current is approximately zero. As such there are six zero crossings per motor cycle, and a complete motor cycle is divided into six pulse generation intervals $sec_1 \ldots sec_6$. Commutation is determined by sensing zero crossings and using the time interval between successive zero crossings to establish the temporal control of the coil drivers 30, 32 and 34. Each pulse generation interval, defined by two successive zero crossings, is divided into eight time divisions $T_1 \ldots T_8$ with equal time spacing. At the beginning of each time division $T_1$, one coil 16 is sourcing current while another is sinking current, and the third coil 16 is off. Calibration is performed during the time division $T_1$ in each pulse generation interval by measuring the peak current in a coil 16, when the current in a second coil is zero corresponding to the BEMF zero crossing of the second coil.

Referring to FIG. 5, each coil driver 30, 32, 34, includes a top DMOS driver 58 and a bottom DMOS driver 60. The top DMOS driver 58, controlled by a top voltage controller 62, takes a coil to the power supply voltage (e.g. 12 volts) and the bottom DMOS driver 60, controlled by a bottom voltage controller 64, takes the coil to the ground. Generally, when the gate of a DMOS device is driven hard, the DMOS device behaves as a resistor Rdson. As such the flow of current through the Rdson resistor creates a voltage that is proportional to the current. For controlling ramp down currents in the coils 16, six DMOS sense amplifiers 66 are utilized. Each DMOS sense amplifier 66 is connected in parallel between the drain and the source of a DMOS driver to sense and amplify the voltage across the DMOS driver and output a sense current proportional to the coil current in the circuit branch of the DMOS driver.

Effectively, each sense amplifier 66 monitors the resistance Rdson of a DMOS driver to determine the current through the corresponding coil 16. The DMOS current is measured only when the voltage at the gate of the DMOS driver is at or near a maximum, wherein the DMOS driver is well into its resistive region. This can be accomplished by sensing when the DMOS driver gate is at its highest level before taking any measurement. The sense currents from the six sense amplifiers 66 for the three pairs of top and bottom DMOS drivers 58, 60 are designated as $U_t$, $U_b$, $V_t$, $V_b$, $W_t$ and $W_b$.

Figure 7:
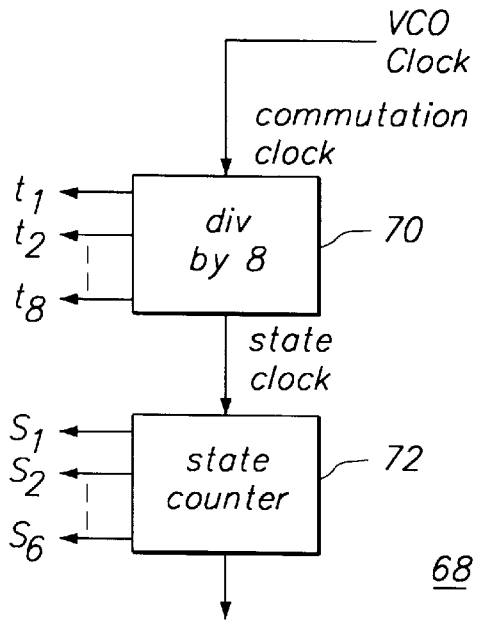
FIG. 7 shows an example block diagram of the architecture of the commutation control and timing circuit of FIG. 6.

When the motor 14 has achieved a desired operational speed, the motor driver circuit 12 takes control of driving the coils 16. The zero crossings of the BEMF voltages from the coils U, V and W are processed by the PLL controller 18 to generate the VCO clock signals to a commutation control and timing circuit 68. The BEMF voltage of each coil 16 is sensed by turning the coil driver off from about −7.5 to about +7.5 degrees around the zero crossing, while the other two coils are sinking and sourcing currents. Referring to FIG. 7, a block diagram of the architecture of an embodiment of the commutation control and timing circuit 68 is shown. The VCO commutation clock signal triggers a divide-by-8 divider 70 which generates time step signals $t_1 \ldots t_8$, dividing the interval between two zero-crossings (pulse generation interval) into the eight time divisions $T_1 \ldots T_8$. The divider 70 then clocks a state counter 72 to generate six state control signals $s_1 \ldots s_6$ per motor cycle, for dividing each motor cycle into the six zero crossing pulse generation intervals $sec_1 \ldots sec_6$, whereby each pulse generation interval includes the eight time divisions $T_1 \ldots T_8$. At the beginning of each pulse generation interval (zero crossing) an appropriate DMOS driver is selected for commutating the motor 14. Each of the pulse generation intervals $sec_1 \ldots sec_6$ includes a ramp down coil current, a ramp up coil current and a constant coil current as shown in FIG. 6.

Referring to FIG. 5, the sense currents $U_t$, $U_b$, $V_t$, $V_b$, $W_t$ and $W_b$ are sequenced to a resistor Rpeak 74 through an amplifier multiplexer 76 at a designated time during the six corresponding pulse generation intervals $sec_1 \ldots sec_6$, respectively. The designated time for measuring a peak coil current can be at the beginning of each pulse generation interval as controlled by a sample peak signal via a switch 78, wherein the state signals $s_1 \ldots s_6$ control the amplifier multiplexer 76 such that a sense current is coupled to the resistor Rpeak 74 per state signal $s_1 \ldots s_6$. The sense currents $U_t$, $U_b$, $V_t$, $V_b$, $W_t$ and $W_b$ are sequenced to the resistor Rpeak 74 at designated times corresponding to the six state signals from the state counter 72 per motor cycle, respectively. Each sense current generates a sense voltage across the resistor Rpeak 74 proportional to the corresponding coil current.

During each pulse generation interval, the sense current corresponding to a peak current in the corresponding coil 16 generates a peak voltage PV across the resistor Rpeak 74, and the peak voltage PV is stored in a capacitor Cpeak 80. The voltage of the capacitor Cpeak 80 is applied across the selector circuit 46 comprising a voltage divider ladder 82 including eight equal resistors 84 designated as $r_1 \ldots r_8$ connected in series. The ladder 82 effectively divides the voltage PV into eight voltage segments $v_1 \ldots v_8$ which determine the shape of the ramp down coil current waveform for the coils 16. In this example embodiment, $v_1$=PV, $v_2$=⅞×PV, $v_3$=⅝×PV, $v_4$=⅝×PV, $v_5$=½×PV, $v_6$=⅜×PV, $v_7$=¼×PV and $v_8$=⅛×PV.

During each pulse generation interval, a sense current corresponding to a DMOS driver is coupled to the resistor Rpeak 74 through the amplifier multiplexer 76, and converted to a sense voltage. The sense voltage is then input to a ramp down comparator 86. Therefore, during pulse generation intervals $sec_1 \ldots sec_6$, the sense currents $U_t$, $U_b$, $V_t$, $V_b$, $W_t$ and $W_b$, respectively, are coupled to the Rpeak resistor 74 via the amplifier multiplexer 76 to generate corresponding sense voltages as sequential inputs to the ramp down comparator 86.

Further, during each pulse generation interval, timing step signals $t_1 \ldots t_8$ from the timing circuit 68 are coupled to a ladder multiplexer 88 for sequentially selecting the voltages $v_1 \ldots v_8$ of the divider 82 and outputting the selected voltages to the ramp down comparator 86 during time divisions $T_1 \ldots T_8$, respectively. The ramp down comparator 86 compares an input sense voltage with an input selected voltage, and generates an output signal to a ramp down multiplexer 90. The ramp down multiplexer 90 is controlled by the state signals $s_1 \ldots S_6$ from the timing circuit 68 and couples an input signal from the ramp down comparator 86 to one of the inputs $U_{p-drv}$, $U_{lo-drv}$, $V_{p-drv}$, $V_{lo-drv}$, $W_{p-drv}$ and $W_{lo-drv}$, of the coil drivers 30, 32 and 34 based on the state signals. The $U_{p-drv}$ and $U_{lo-drv}$ inputs to the Udriver 30 control the top and bottom voltage controllers 62, 64 for the DMOS drivers 58, 60 of the U coil, respectively. The $V_{p-drv}$ and $V_{lo-drv}$ inputs to the Vdriver 32 control the top and bottom voltage controllers 62, 64 for the DMOS drivers 58, 60 of the V coil, respectively. And, the $W_{p-drv}$ and $W_{lo-drv}$ inputs to the Wdriver 34 control the top and bottom voltage controllers 62, 64 of the DMOS drivers 58, 60 of the W coil, respectively. As such, the output signal of the ramp down comparator 86 is coupled to the voltage controller 62 or 64 of a DMOS driver 58 or 60 corresponding to the sense current for the pulse generation interval.

Each of the voltage controllers 62, 64 includes a one-shot monostable multivibrator having a first state for turning the corresponding DMOS driver on, and a second state for turning the DMOS driver off. While the sense voltage across the resistor Rpeak 74 is below the selected ladder voltage, the output signal from the ramp down comparator 86 keeps the one-shot in the first state via the ramp down multiplexer 90, whereby the DMOS driver remains on. When the sense voltage across the resistor Rpeak 74 reaches the selected ladder voltage, the output signal from the ramp down comparator 86 places the one-shot in the second state via the ramp down multiplexer 90, whereby the one-shot turns the DMOS driver off for a fixed time interval. As such, the current to the coil driven by the corresponding DMOS diver is turned off for the fixed off period to decay.

For example, referring to FIG. 6, during the pulse generation interval $sec_1$ the current in the coil V is ramping down and the coil V has a maximum source current, the coil U has a maximum sink current and the coil W has a zero current. During the time division $T_1$ in the pulse generation interval $sec_1$, the capacitor Cpeak 80 is charged to the maximum voltage PV by the sense current $V_1$ through the resistor Rpeak 74. The ladder 82 subdivides the peak voltage PV into eight equal step voltage levels $v_1 \ldots v_8$ to form a trapezoidal ramp down current waveform for the coil V during the pulse generation interval $sec_1$. Each step of the voltages $v_1 \ldots v_8$ of the ladder 82 is selected and activated in sequence by the timing signals $t_1 \ldots t_8$, respectively, through the ladder multiplexer 88. The voltage levels $v_1 \ldots v_8$ represent selected voltage levels corresponding to time divisions $T_1 \ldots T_8$, respectively.

For each step, the ramp down comparator 86 compares the selected voltage level and the sense voltage generated across the resistor Rpeak 74 by the sense current $V_t$ flowing therein. When the sense voltage across the resistor Rpeak 74 reaches the selected voltage, the ramp down comparator 86 turns off the top DMOS driver 58 of the coil V for a fixed time period of about 8 microseconds via the one-shot of the voltage controller 62. After the off period, the current through the V coil has decreased and the ramp down comparator 86 keeps the top DMOS driver 58 for the coil V on via the one-shot of the voltage controller 62. The above steps are repeated for the duration of the time division $T_1$ and for all the time divisions in the pulse generation interval $sec_1$. Therefore, during successive time divisions $T_1 \ldots T_8$, the current in the V coil only rises to a selected voltage level among $v_1 \ldots v_8$ as determined by the ladder 82, and follows a generally decreasing pattern for the pulse generation interval $sec_1$.

Because the off periods are fixed, an off period can overlap from a first time division $T_j$ to a second successive time division $T_{j+1}$. In that case, after the completion of the off period in the second time division, if the sense voltage for the coil is less than the ladder voltage for the second time division, the appropriate DMOS driver for the coil is turned on until the ladder voltage for the second time division is reached. However, if after the overlapping off period, the coil voltage is above the ladder voltage for the second time division, another fixed off interval begins.

For ramp up current control, the bottom DMOS drivers 60 are connected together to an external resistor 92. A sum amplifier 94 connected across the resistor 92 measures the total current through the coils 16 and outputs a corresponding voltage level. The output voltage of the sum amplifier 94 and a maximum peak voltage control signal supplied by a Dac filter 96, are input to a ramp up comparator 98 to control the maximum peak current flowing through the coils 16. The output of the ramp up comparator 98 is input to a ramp up multiplexer 100 controlled by the state signals $s_1 \ldots S_6$ from the timing circuit 68. As such, the multiplexer 100 couples an input signal from the ramp up comparator 98 to one of the inputs $U_{p\text{-}drv}$, $U_{lo\text{-}drv}$, $V_{p\text{-}drv}$, $V_{lo\text{-}drv}$, $W_{p\text{-}drv}$ and $W_{lo\text{-}drv}$, of the coil drivers 30, 32 and 34 based on the state signals.

The output signal of the ramp up comparator 98 controls current flow through the coils via the DMOS drivers for ramp up coil currents. When the level of current through the coils as measured by the sum amplifier 94 is above said maximum peak voltage, the DMOS drivers are selectively turned off by through the ramp up multiplexer 100 until current flowing through the coils during ramp up falls to, or below, the maximum peak voltage. As such, coil currents are locally controlled by the Dac filter voltage. Any change in maximum peak voltage by the Dac filter 96, is immediately applied to the coil currents in a linear fashion. Control of the currents is not affected by coil inductance, col resistance, coil BEMF voltage, coil current or the power supply For example, during the pulse generation interval $sec_1$, the current in the W coil is ramping up and is complementary to the ramp down current in the V coil as shown in FIG. 6. The sum amplifier 94 measures both the ramp down current in the coil V and the ramp up current in the coil W. The ramp up current in the coil W is controlled by the action of the sum amplifier 94 and the ramp up comparator 98 using the Dac filter maximum peak voltage control signal. When the voltage output of the sum amplifier 94 reaches the maximum peak voltage value specified by the Dac maximum peak control signal, the ramp up comparator 98 turns the top DMOS driver 58 for the coil W off for a fixed period of 8 microseconds through the ramp up multiplexer 100 via a one-shot.

After the off period, the current in the W coil has decreased to a level complementary to the ramp down current in the coil V. The ramp up comparator 98 then turns the top DMOS driver 58 for the coil W on via a one-shot until the voltage output of the sum amplifier 94 reaches the peak voltage specified by the Dac filter control signal. Since the maximum voltage level reached by the sum amplifier 94 is held constant by the Dac maximum peak voltage control signal, as the current in the coil V decreases, the current in the coil W increases by an amount equal to the decrease in the current in the coil V. As such, in the pulse generation interval $sec_1$, the current in the coil W ramps up in a complementary relationship to that the current in coil V as shown in FIG. 6.

Further, the voltage across the capacitor Cpeak 80 is held constant for the duration of the pulse generation interval $sec_1$. The sum amplifier 94 is used to trigger the ramp up comparator 98 when the voltage output of the sum amplifier 94 is equal to the Dac filter voltage as controlled by a maximum peak current microprocessor controller 102. At the beginning of the pulse generation interval $sec_1$, the ramp up comparator 98 establishes a maximum peak voltage for the capacitor Cpeak 80, representing the peak current $V_t$ of the top DMOS driver 58 for the coil V. As such, the current flowing through the top DMOS driver 58 of the coil V at the beginning of the pulse generation interval $sec_1$ is the same as the current flowing through the resistor 92 because the coil W is held off.

Therefore, the peak current generated by each DMOS sense amplifier 66 is calibrated using the sum across the resistor 92 at a time when only two coils are conducting (zero crossing). Using the sum amplifier 94 as a calibrator makes the DMOS sense amplifiers 66 insensitive to variations in the resistance Rdson of the DMOS drivers due to process and temperature variations.

Referring to FIG. 6, as aforementioned, during each pulse generation interval, one coil current is held constant while the other two coil currents are varying. The sum of the varying currents at each point during the pulse generation interval is equal to the constant current. The DMOS drivers for the coils are controlled by a sum multiplexer 104 triggered by the state signals from the timing circuit 68, such that during each pulse generation interval, one of the top or bottom DMOS drivers 58, 60 for a coil is selected and kept on for the duration of the pulse generation interval based on the state signals. For example, during the pulse generation interval $sec_1$, the sum multiplexer 104 selects the bottom DMOS driver 60 for the U coil in response to the state signals, and the selected DMOS driver 60 is kept on for the duration of the pulse generation interval $sec_1$ to keep the current in the U coil at a constant level while the currents in the coils V and W vary. The sum of the currents in the coils V and W at each point during the pulse generation interval $sec_1$ is equal to the current in the coil U. The motor driver circuit 12 repeats the above steps for pulse generation interval sections $sec_1 \ldots sec_6$ per motor cycle, and the entire process is repeated for subsequent motor cycles.

Figure 8:
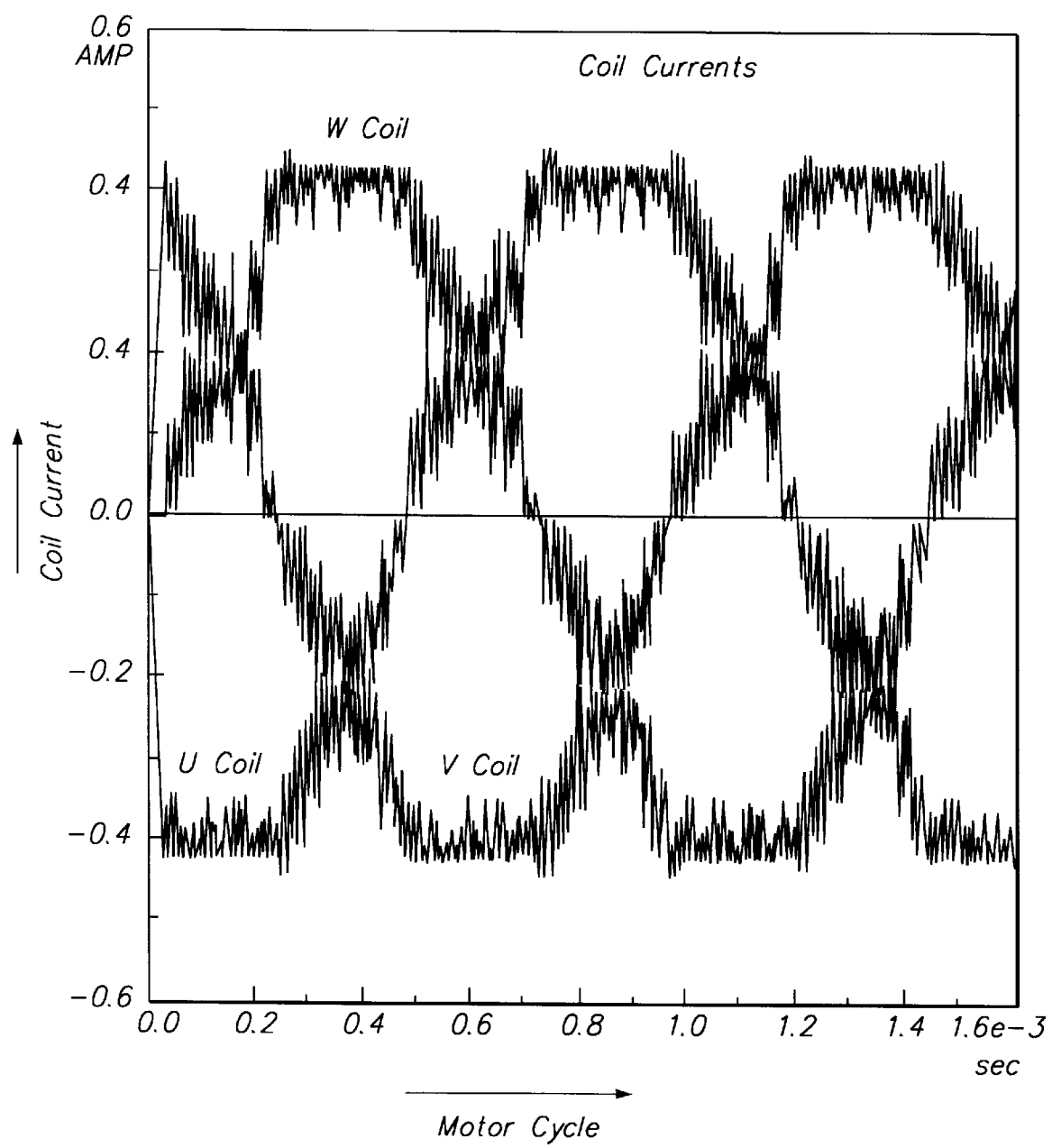
FIG. 8 shows example simulated coil current waveforms corresponding to the waveforms in FIG. 6.

For example, referring to FIG. 6, under the control of the motor circuit driver 12, in the pulse generation interval $sec_2$, the coil W sources current and is held constant, the current in the coil U ramps down from a maximum negative value to zero, and the current in the coil V ramps up from a zero value to a maximum negative value. The sum of currents in the coils U and V at each point during the pulse generation interval $sec_2$ is equal to that of the current in the coil W. During the pulse generation interval $sec_3$, the current in the coil V is held constant while the currents in the coils U and W varying. Although the coil current waveforms shown in FIG. 6 appear to have smooth segments, in practice the waveforms are jagged and are in discrete steps as shown in the simulation waveforms of FIG. 8.

Figure 9:
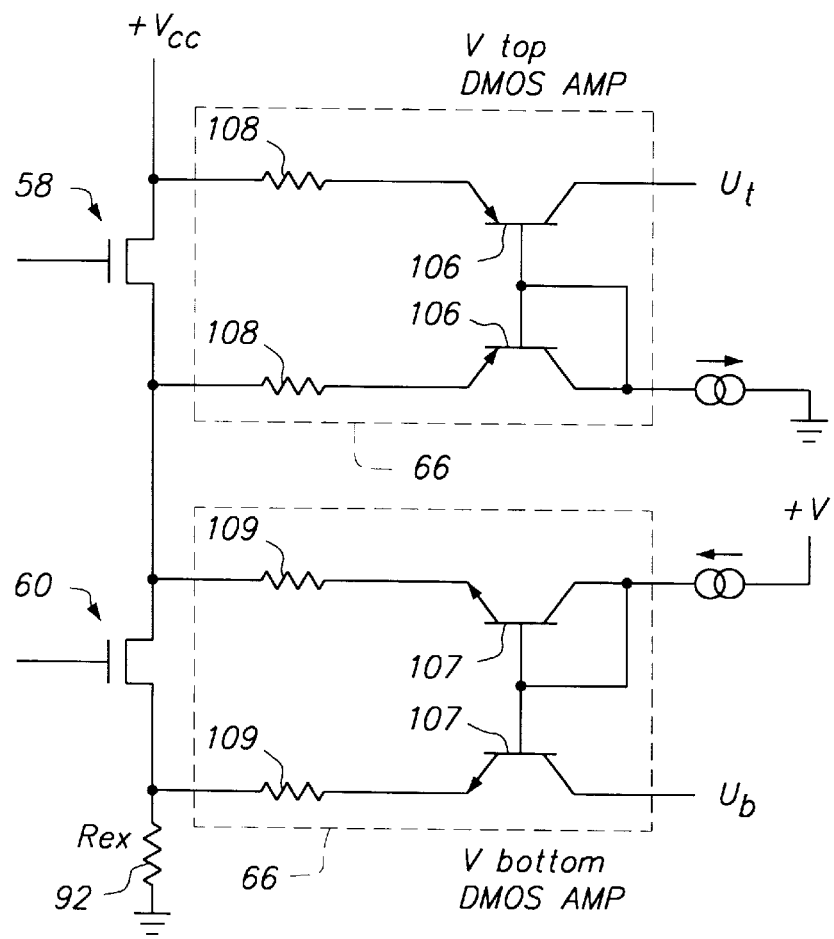
FIG. 9 shows an example embodiment of a DMOS sense amplifier of FIG. 5.

FIG. 9 shows example embodiment of DMOS sense amplifier 66 across the top and bottom DMOS drivers 58, 60 for the U coil. The DMOS sense amplifier 66 for the top DMOS driver 58 comprises a current mirror circuit including two PNP bipolar transistors 106 with their emitters used as differential inputs through two emitter resistors 108. The DMOS sense amplifier 66 for the bottom DMOS driver 60 comprises a current mirror circuit including two NPN bipolar transistors 107 used as differential inputs through two emitter resistors 109.

Referring to the DMOS sense amplifier 66 for the top DMOS driver 58, when no current is flowing through the DMOS driver resistance Rdson, the current mirror is essentially balanced. As current flows through the DMOS driver resistance Rdson, the voltage generated across Rdson is reflected in one branch of the current mirror and increases the current mirror output $U_r$. The emitter resistors 108 provide means for linearizing the current and voltage relationship, wherein a change of voltage appears mainly across the resistors so that the exponential change of current change due to transistor $V_{be}$ is less pronounced. Further, the temperature coefficient of Rdson (0.48% per degree) is similar for the Pbody resistor (0.43% per degree), wherein increase in Rdson for high temperature is compensated by the emitter resistors 108. The sense amplifiers 66 need not be balanced with one another since only their relative readings are necessary for calibration.

Though in the embodiment of the motor driver circuit 12 shown in FIG. 5, six sense amplifiers 66 are utilized, in another embodiment of the motor driver circuit 12 only one sense amplifier 66 can be used with a sense multiplexer clocked by the state signal of the timing circuit 68. As such the six DMOS drivers are sequentially coupled across one sense amplifier in parallel via the sense multiplexor, in a similar manner as the resistor Rpeak 74 is coupled to the six sense currents via the amplifier multiplexer 76.

The trapezoidal current waveforms described above, approximate the sinewave of BEMF coil voltages, with an average difference of about 11%. As such a trapezoidal waveform is smooth enough to meet the requirement for a sinewave. The timing of the time step signals $t_1 \ldots t_8$ in the timing circuit 68 and the values of the resistors $r_1 \ldots r_8$ in the voltage ladder 82 can be changed to form other desired waveforms. Similarly, the number of said timing step signals $t_1 \ldots t_8$ and the number of the resistors $r_1 \ldots r_8$ can be changed for desired waveforms. Further, others means than the divider 82 for selecting voltages and currents as a function of the measured peak voltage and currents, respectively, for comparison with sense currents and voltages can be utilized. And, the present invention is not limited to generating the trapezoidal waveform described here in. Further, another pulse generator similar to the pulse generator 54 as used for the ramp down currents can be used for controlling ramp up currents instead of the ramp up circuit 52 described above. Further the length of the fixed off interval can be selected based on the motor and coil characteristics, and based on the rate of decay of coil currents or voltages.

Figure 10:
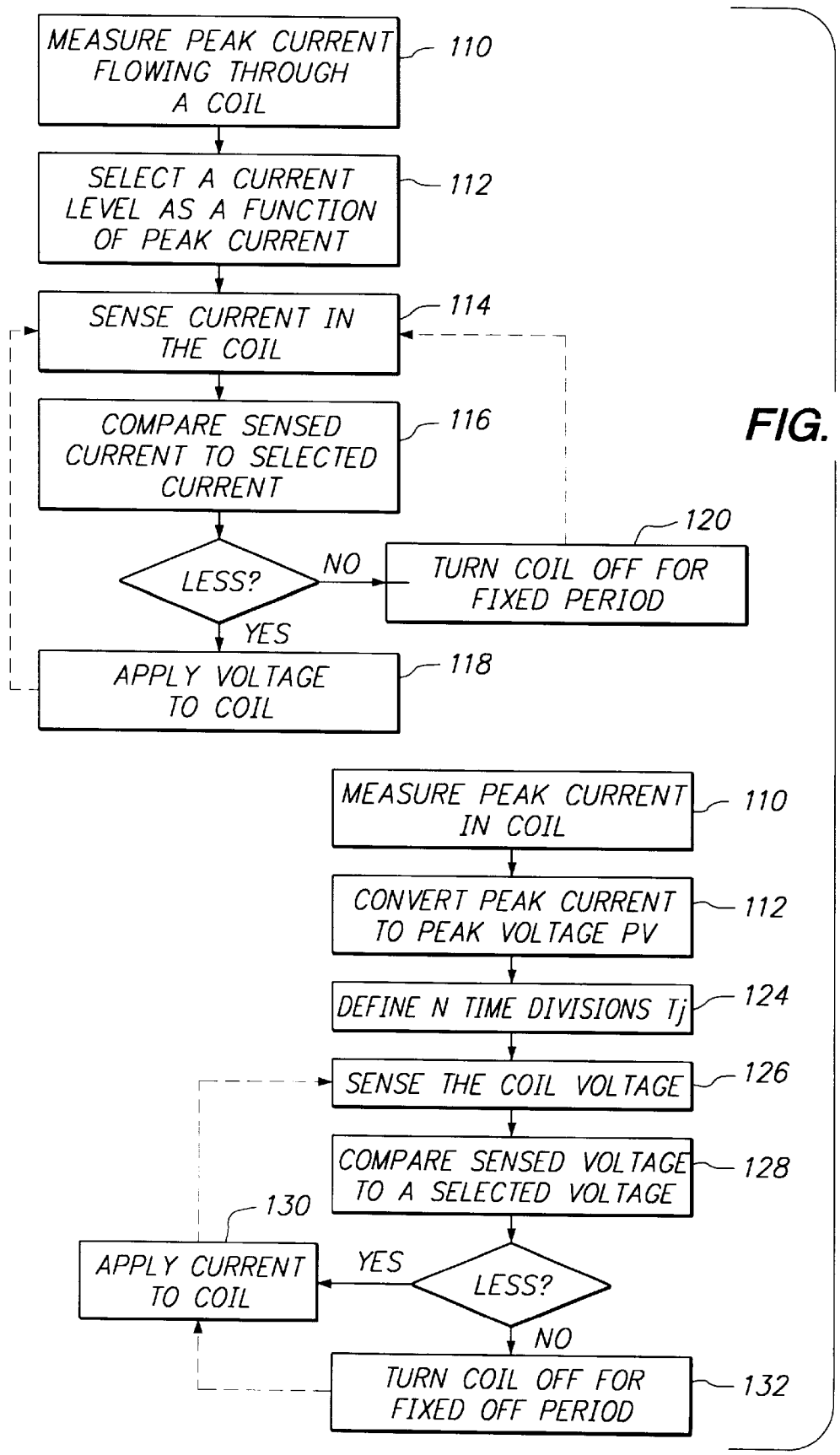
FIG. 10 shows an example embodiment of a method of shaping current waveforms according to another aspect of the present invention.

Referring to FIG. 10, in another aspect the present invention provides a method of generating desired cyclical current waveforms in one or more of said coils, comprising the steps of: selecting one of said coils and measuring a peak current level flowing through the selected coil during a pulse generation interval, each pulse generation interval being defined by commutation timing signals corresponding to successive BEMF zero crossings of the phase coils (step 110); and generating and applying a train of voltage pulses to the selected coil to form said desired current waveform, by: selecting a current level as a function of the peak current (step 112), sensing the coil current (step 114), comparing the sensed current to the selected current (step 116), is less applying voltage to the coil for an ON period (step 1 18), if equal or more turning coil off for a fixed OFF period (step 120). As such, each pulse includes: (1) an ON interval during which the motor driver applies a drive voltage to the selected coil until the level of current flowing through the selected coil reaches a selected current level as a function of said peak current; and (2) a fixed OFF interval during which the drive voltage is decoupled from the selected coil. Steps 114 through 120 are repeated during each pulse generation interval. Step 110 through 120 are repeated for each pulse generation interval.

In another embodiment, generating said train of voltage pulses comprises the steps of, for each pulse generation interval: measuring the peak current in a selected coil substantially at the beginning of the pulse generation interval in step 110; converting the peak current to a peak voltage PV (step 122); and defining N time divisions $T_j$ in the pulse generation interval, where j=1 ... N (step 124). During each time division $T_j$ the following steps are performed: sensing the voltage of the selected coil (step 126); comparing the sensed voltage to a selected voltage as a function of the peak voltage (step 128); applying current to the selected coil as needed until the coil voltage reaches a selected voltage level as a voltage function of the peak voltage PV (step 130); ceasing applying current to the coil during the OFF interval (step 132). Steps 126 through 132 are repeated during each pulse generation interval, and steps 110 through 132 are repeated for each pulse generation interval.

The voltage peak PV is divided into N equal divisions of PV/N, applying current to the selected coil includes applying current until the coil voltage reaches a voltage level defined by the voltage function relation PV−(PV/N×(j−1)), where j=1 ... N. Further, defining the time divisions comprises dividing each pulse generation interval into N time divisions $T_j$, where j=1 ... N, in response to a time division signal dividing each commutation cycle into N time intervals.

During each pulse generation interval the peak current in the selected coil is measured when the level of current in a second coil is substantially zero, a voltage is applied to the second coil such that during said pulse generation interval the sum of currents through the selected coil and the second coil is substantially equal to the current through the third coil. The current level in the third coil is maintained at a substantially constant level, where by said current waveform is generally trapezoidal.

Although the present invention has been described in considerable detail with regard to preferred versions thereof, other versions are possible. Therefore, the appended claims should not be limited to the descriptions of the preferred versions contained herein.

What is claimed is:

1. In a motor driver circuit for a spindle motor having multiple phase coils and a rotor, the motor driver circuit selectively energizing one or more of the phase coils to rotate the rotor, a method of generating current waveforms for one or more of the phase coils to optimally rotate the rotor, comprising the steps of:
   (a) selecting an energized phase coil;
   (b) measuring a current level flowing through the selected coil between at least one pair of BEMF voltage zero crossings of the phase coils in each cycle of the motor; and
   (c) generating and applying a cyclical current waveform to the selected coil as a function of the measured current level in relation to the BEMF voltage of at least the selected coil to induce optimum torque to rotate the rotor.

2. The method of claim 1, wherein:
   step (b) further comprises the steps of measuring a calibrating current level flowing through at least the selected coil; and
   step (c) further comprises the steps of generating and applying said cyclical current waveform to the selected coil as a function of the measured current level and the calibrating current level, in relation to the BEMF voltage of at least the selected coil to induce optimum torque to rotate the rotor.

3. The method of claim 2, wherein the steps of measuring the calibrating current level comprises measuring a peak current level flowing through at least the selected coil, substantially at a BEMF voltage zero crossing of a second coil.

4. The method of claim 1, wherein:
   step (b) of measuring said current level comprises the steps of sensing the current level flowing through the selected coil multiple times between at least said pair of BEMF voltage crossings of the phase coils in each cycle of the motor; and
   step (c) further comprises the steps of generating and applying said cyclical current waveform to the selected coil as a function of the sensed current levels in relation to the BEMF voltage of at least the selected coil to induce optimum torque to rotate the rotor.

5. The method of claim 1, further comprising the steps of repeating steps (b) and (c) between said pair of BEMF voltage zero crossings.

6. The method of claim 1, further comprising the steps of repeating steps (a)–(c) between successive BEMF voltage zero crossings of the phase coils.

7. The method of claim 1, further comprising the steps of performing steps (a)–(c) for two or more coils between each pair of BEMF voltage zero crossings of the phase coils.

8. The method of claim 1, wherein step (b) further comprises the steps of energizing a second coil to generate a current waveform in the second coil substantially complementary to the current waveform in the selected coil.

9. The method of claim 8, wherein the spindle motor includes three phase coils, and the second coil is energized such that at least during a portion of an interval defined by said pair of BEMF voltage crossings, the sum of currents through the selected coil and the second coil is substantially equal to the current through the third coil.

10. The method of claim 9, further comprising the step of maintaining the current level in the third coil at a substantially constant level, whereby said current waveform is generally trapezoidal.

11. The method of claim 1, wherein the motor driver circuit selectively energizes one or more of the coils in response to commutation timing signals from a commutation phase generation means responsive to BEMF voltage zero crossings of the phase coils, wherein:
   step (b) comprises the steps of measuring a peak current level flowing through the selected coil during a pulse generation interval, each pulse generation interval being defined by commutation timing signals corresponding to successive BEMF zero crossings of the phase coils; and
   step (c) further comprises the steps of generating and applying a train of voltage pulses to the selected coil to form said cyclical current waveform, wherein each pulse includes:
      (1) an ON interval during which the motor driver applies a drive voltage to the selected coil until the level of current flowing through the selected coil reaches a selected current level as a function of said peak current; and
      (2) a fixed OFF interval during which the drive voltage is decoupled from the selected coil substantially in step with the BEMF in the selected coil to optimize torque.

12. The method of claim 11, wherein:
   step (b) further comprises the steps of measuring the peak current in the selected coil substantially at the beginning of the pulse generation interval; and
   step (c) further comprises the steps of:
      converting the peak current to a peak voltage PV; and
      defining N time divisions $T_j$ in the pulse generation interval, where $j=1 \ldots N$, and during each time division $T_j$, performing the steps of:
         (1) sensing the voltage of the selected coil;
         (2) applying current to the selected coil as needed until the coil voltage reaches a selected voltage level as a voltage function of the peak voltage PV;
         (3) ceasing applying current to the coil during the OFF interval; and
         (4) repeating steps (1) through (3).

13. The method of claim 12, further comprising the steps of dividing the peak voltage PV into N equal divisions of PV/N and wherein the step of applying current to the selected coil includes applying current until the coil voltage reaches a voltage level defined by the voltage function relation $PV-(PV/N \times (j-1))$, where $j=1 \ldots N$.

14. The method of claim 12, wherein defining the time divisions comprises dividing each pulse generation interval into N time divisions $T_j$, where $j=1 \ldots N$, in response to a time division signal dividing each commutation cycle into N time intervals.

15. The method of claim 11, wherein the spindle motor comprises three phase coils and during each pulse generation interval the peak current in the selected coil is measured when the level of current in a second coil is substantially zero, and further comprising the steps of generating and applying a voltage to the second coil such that during said pulse generation interval the sum of currents through the selected coil and the second coil is substantially equal to the current through the third coil.

16. The method of claim 15, further comprising the step of maintaining the current level in the third coil at a substantially constant level, where by said current waveform is generally trapezoidal.

17. A motor driver circuit for a disk drive including a spindle motor having multiple phase coils and corresponding coil drivers, for selectively energizing one or more of the phase coils to rotate a rotor, the motor driver circuit comprising:
a sensor for sensing a current level flowing through a selected energized coil; and a drive control signal generator coupled to the sensor, for providing drive control signals to the corresponding coil driver between at least one pair of BEMF voltage zero crossings of the phase coils, to control current flow in the selected coil as a function of the sensed coil current levels to form a cyclical current waveform therein in relation to the BEMF voltage of at least the selected coil to induce optimum torque to rotate the rotor.

18. The motor driver circuit of claim 17, wherein the drive control signal generator includes a controller coupled to the sensor for measuring a calibrating current level flowing through said energized coil, such that drive control signal generator provides said drive control signals to the corresponding coil driver to control current flow in the selected coil as a function of the sensed coil current levels and the calibrating current level to form the cyclical current waveform therein in relation to the BEMF voltage of at least the selected coil to induce optimum torque to rotate the rotor.

19. The motor driver circuit of claim 18, wherein the controller measures a peak current level flowing through at least the selected coil as the calibrating current level, substantially at a BEMF voltage zero crossing of a second coil.

20. The motor driver circuit of claim 17, wherein the sensor senses the current level flowing through the selected coil multiple times between at least said pair of BEMF voltage zero crossings of the phase coils in each cycle of the motor; and the drive control signal generator provides said drive control signals to the corresponding coil driver to control current flow in the selected coil as a function of the sensed coil current levels to form the cyclical current waveform therein in relation to the BEMF voltage of at least the selected coil to induce optimum torque to rotate the rotor.

21. The motor driver circuit of claim 17, further comprising selection means for selecting one of the energized coils between successive BEMF voltage zero crossings of the phase coils.

22. The motor driver circuit of claim 17, further comprising circuit means for energizing a second coil to generate a current waveform in the second coil substantially complementary to the current waveform in the selected coil.

23. The motor driver circuit of claim 22, wherein the spindle motor includes three phase coils, and said circuit means energizes the second coil that at least during a portion of an interval defined by said pair of BEMF zero crossings, the sum of currents through the selected coil and the second coil is substantially equal to the current through the third coil.

24. The motor driver circuit of claim 17, wherein the disk drive further includes commutation phase generation means responsive to BEMF voltage zero crossings of the phase coils for generating commutation timing signals for the motor phases, and a timing signal generator for generating state control signals in response to said commutation timing signals, the state control signals corresponding to successive BEMF voltage zero crossings of the phase coils, a pulse generation interval being defined by a pair of successive state control signals, and wherein
the drive control signal generator comprises a pulse generator coupled to the sensor and responsive to the state control signals, for generating a train of drive control pulses to the corresponding coil driver during each pulse generation interval for controlling current flow in the selected coil in response to sensed coil current levels to form the cyclical current waveform therein, each pulse including: (1) an ON period wherein said coil driver applies a drive voltage to the selected coil, and (2) an fixed OFF period wherein said coil driver cuts off the drive voltage to the selected coil for a fixed time interval.

25. The motor driver circuit of claim 24, wherein the pulse generator comprises:
(a) a controller coupled to the sensor and responsive to each state control signal for detecting a peak current level flowing through the selected coil;
(b) a selector circuit responsive to the controller and to selection control signals for selecting a current level as a function of said peak current level;
(c) a comparator coupled to the sensor and to the selector circuit for comparing a sensed current level in the selected coil to said selected current level, and for generating an output signal having: (1) a first state wherein the current level in the selected coil is below the selected current level, and (2) a second state wherein the current level in the selected coil is at or above the selected current level; and
(d) a pulse signal generator responsive to the comparator output signal for generating said drive control pulses, wherein each pulse includes: (1) said ON period corresponding to said first state whereby the corresponding coil driver applies a drive voltage to the selected coil until the level of current flowing through the selected coil reaches the selected current level, and (2) said fixed OFF period triggered by said second state whereby the corresponding coil driver cuts off the drive voltage for a fixed time interval.

26. The motor driver circuit of claim 25, further comprising divider means responsive to the commutation timing signals for generating time division signals dividing each pulse generation interval into N time divisions $T_j$, where j=1 ... N, the divider means being coupled to the selector circuit for providing the time division signals as said selection signals, wherein in response to each time division signal the selector circuit selects a current level for a corresponding time division $T_j$;
wherein, in each pulse generation interval:
(1) the controller detects the peak current level in a coil substantially at the beginning of the pulse generation interval; and
(2) in response to each time division signal corresponding to a time division $T_j$, the selector circuit selects a current level, whereby the comparator compares the current level in the coil to said selected current level, and the pulse signal generator generates one or more drive control pulses in response to the comparator output signal if needed, wherein, in response to each control pulse, the corresponding coil driver applies voltage to the coil until the level of current flowing through the coil reaches the selected current level, and then cuts off the drive voltage to the coil for a fixed time interval.

27. The motor driver circuit of claim 25, wherein the spindle motor comprises three phase coils and during each pulse generation interval the controller detects the peak current in a selected coil when the level of current in a second coil is substantially zero, and wherein the motor driver circuit further comprises circuit means for controlling the coil driver corresponding to the second coil such that during said pulse generation interval the sum of currents through the selected coil and the second coil is substantially equal to the current through the third coil.

28. The motor driver circuit of claim 27, further comprising means for maintaining the current level in the third coil at a substantially constant level, whereby said current waveform is generally trapezoidal.

29. A motor driver circuit for a disk drive including a spindle motor having multiple phase coils and corresponding coil drivers, for selectively energizing one or more of the phase coils to rotate a rotor, the motor driver circuit comprising:
 a sensor for sensing a voltage level of a selected energized coil; and a drive control signal generator coupled to the sensor, for providing drive control signals to the corresponding coil driver between at least one pair of BEMF voltage zero crossings of the phase coils, to control current flow in the selected coil as a function of the sensed coil voltage levels to form a cyclical current waveform therein in relation to the BEMF voltage of at least the selected coil to induce optimum torque to rotate the rotor.

30. The motor driver circuit of claim 29, wherein the drive control signal generator includes a controller coupled to the sensor for measuring a calibrating voltage level of said energized coil, such that drive control signal generator provides said drive control signals to the corresponding coil driver to control current flow in the selected coil as a function of the sensed coil voltage levels and the calibrating voltage level to form the cyclical current waveform therein in relation to the BEMF voltage of at least the selected coil to induce optimum torque to rotate the rotor.

31. The motor driver circuit of claim 30, wherein the controller measures a peak voltage level of the selected coil as the calibrating voltage level, substantially at a BEMF voltage zero crossing of a second coil.

32. The motor driver circuit of claim 29, wherein the sensor senses the voltage level of the selected coil multiple times between at least said pair of BEMF voltage zero crossings of the phase coils in each cycle of the motor; and the drive control signal generator provides said drive control signals to the corresponding coil driver to control current flow in the selected coil as a function of the sensed voltage levels to form the cyclical current waveform therein in relation to the BEMF voltage of at least the selected coil to induce optimum torque to rotate the rotor.

33. The motor driver circuit of claim 29, further comprising selection means for selecting one of the energized coils between successive BEMF voltage zero crossings of the phase coils.

34. The motor driver circuit of claim 29, further comprising circuit means for energizing a second coil to generate a current waveform in the second coil substantially complementary to the current waveform in the selected coil.

35. The motor driver circuit of claim 29, wherein the disk drive further includes commutation phase generation means responsive to BEMF voltage zero crossings of the phase coils for generating commutation cycle control signals for the motor phases, and a timing signal generator for generating state control signals in response to said commutation timing signals, the state control signals corresponding to successive BEMF voltage zero crossings of the phase coils, a pulse generation interval being defined by a pair of successive state control signals and wherein the drive control signal generator comprises a pulse generator coupled to the sensor and responsive to the state control signals, for generating a train of drive control pulses to the corresponding coil driver during each pulse generation interval for controlling current flow in the selected coil in response to sensed coil voltage levels to form said cyclical current waveform therein, each pulse including: (1) an ON period wherein said coil driver applies a drive current to the selected coil, and (2) an fixed OFF period wherein said coil driver cuts off the drive current to the selected coil for a fixed time interval.

36. The motor driver circuit of claim 35, wherein the pulse generator comprises:
 (a) a controller coupled to the sensor and responsive to each state signal for detecting a peak voltage PV of the selected coil;
 (b) a selector circuit coupled to the controller and responsive to selection control signals for selecting a voltage level as a function of said peak voltage level;
 (c) a comparator coupled to the sensor and to the selector circuit for comparing a sensed voltage level of the coil to said selected voltage level, and for generating an output signal having: (1) a first state wherein the voltage level of the selected coil is below the selected voltage level, and (2) a second state wherein the voltage level of the selected coil is at or above the selected voltage level; and
 (d) a pulse signal generator responsive to the comparator output signal for generating said drive control pulses, wherein each pulse includes: (1) said ON period corresponding to said first state wherein the coil driver applies a drive current to the selected coil until the coil voltage coil reaches the selected voltage level, and (2) said fixed OFF period triggered by said second state wherein the coil driver cuts off the drive current for a fixed time interval.

37. The motor driver circuit of claim 36, further comprising divider means responsive to the commutation timing signals for generating time division signals dividing each pulse generation interval into N time divisions $T_j$, where j=1 . . . N, the divider means being coupled to the selector circuit for providing the time division signals as said selection signals, wherein in response to each time division signal the selector circuit selects a voltage level for a corresponding time division $T_j$;
 wherein, for each pulse generation interval:
 (1) the controller detects the peak voltage level PV in a coil substantially at the beginning of the pulse generation interval; and
 (2) in response to each time division signal corresponding to a time division $T_j$, the selector circuit selects a voltage, whereby the comparator compares the sensed voltage level of the coil to said selected voltage level, and the pulse signal generator generates one or more drive control pulses in response to the comparator signal is needed, whereby, in response to each control pulse, the corresponding coil driver applied current to the coil until the coil voltage reaches the selected voltage level, and then cuts off the drive current for a fixed time interval.

38. The motor driver circuit of claim 39, wherein the selector circuit divides the peak voltage PV into N equal divisions of PV/N, and wherein in response to the pulse signal generator the coil driver applies drive current to the coil until the coil voltage reaches a voltage level defined by the voltage level voltage function PV−(PV/N×(j−1)), where j=1 . . . N.

39. The motor driver circuit of claim 35, wherein the spindle motor comprises three phase coils and during each pulse generation interval the controller detects the peak voltage of a selected coil when the level of current in a second coil is substantially zero, and wherein the motor driver circuit further comprises circuit means for controlling the coil driver corresponding to the second coil such that during said pulse generation interval the sum of currents through the selected coil and the second coil is substantially equal to the current through the third coil.

40. The motor driver circuit of claim 39, further comprising means for maintaining the current level in the third coil at a substantially constant level, whereby said current waveform is generally trapezoidal.

* * * * *